US009239116B2

(12) United States Patent
Kreutzer et al.

(10) Patent No.: US 9,239,116 B2
(45) Date of Patent: Jan. 19, 2016

(54) RADIAL SHAFT SEAL

(71) Applicant: VR Automotive Dichtungssysteme GmbH, Auengrund-Crock (DE)

(72) Inventors: Siegmar Kreutzer; Martin Schaub, Hildburghausen (DE)

(73) Assignee: VR Automotive Dichtungssysteme GmbH, Auengrund (DE)

( * ) Notice: Subject to any disclaimer, the term of this patent is extended or adjusted under 35 U.S.C. 154(b) by 0 days.

(21) Appl. No.: 14/379,135

(22) PCT Filed: Feb. 14, 2013

(86) PCT No.: PCT/EP2013/052997
§ 371 (c)(1),
(2) Date: Aug. 15, 2014

(87) PCT Pub. No.: WO2013/124209
PCT Pub. Date: Aug. 29, 2013

(65) Prior Publication Data
US 2015/0054227 A1  Feb. 26, 2015

(30) Foreign Application Priority Data

Feb. 24, 2012 (DE) ...................... 10 2012 202 862 U

(51) Int. Cl.
F16J 15/32 (2006.01)
(52) U.S. Cl.
CPC ............ *F16J 15/3276* (2013.01); *F16J 15/322* (2013.01); *F16J 15/3204* (2013.01); *F16J 15/3232* (2013.01); *F16J 15/3252* (2013.01); *F16J 15/3268* (2013.01)
(58) Field of Classification Search
CPC ..... F16J 15/32; F16J 15/3216; F16J 15/3248; F16J 15/3252; F16J 15/3268
See application file for complete search history.

(56) References Cited

U.S. PATENT DOCUMENTS 3,612,547 A * 10/1971 Kan ............................... 277/563
4,623,153 A * 11/1986 Nagasawa ..................... 277/551
(Continued)

FOREIGN PATENT DOCUMENTS

DE          9213374 U1    3/1994
DE       198 41 123 B4    1/2008
(Continued)

OTHER PUBLICATIONS

Espacenet, English abstract for DE19841123B4, printed on Aug. 15, 2014.
(Continued)

*Primary Examiner* — Gilbert Lee
(74) *Attorney, Agent, or Firm* — Cahn & Samuels, LLP

(57) ABSTRACT

The invention relates to a radial shaft seal for sealing a shaft (2), which is guided through a housing wall opening (3). The seal comprises at least one first membrane-like, annular sealing element (15) with a sealing lip (22) which can be positioned against the shaft (2) in a sealing manner; a metallic, annular supporting element (16), onto which the sealing element (15) is pulled; and a centring surface (19) formed at the outer circumference of the edge area (18). In order to increase the lifespan of the seal, said seal can be surrounded by an adapter part (6) made from undulating curved sheet metal, which can be inserted flush into the housing wall opening (3). The adapter part (6) has a central, cylindrical opening (8) which is provided with a shoulder (11) at the rear end thereof in the compression direction. The centring surface (19) of the supporting body (16) has an allowance for the cylindrical opening (8) of the adapter part (6), and is pushed into said opening in a press-fitting manner. A second membrane-like sealing element (17), which can be firmly pressed between the shoulder (11) and the supporting body (16), is arranged between the supporting body (16) and the shoulder (11) provided in the opening (8) of the adapter part (6).

20 Claims, 2 Drawing Sheets

(56) References Cited

U.S. PATENT DOCUMENTS

Figure 1:
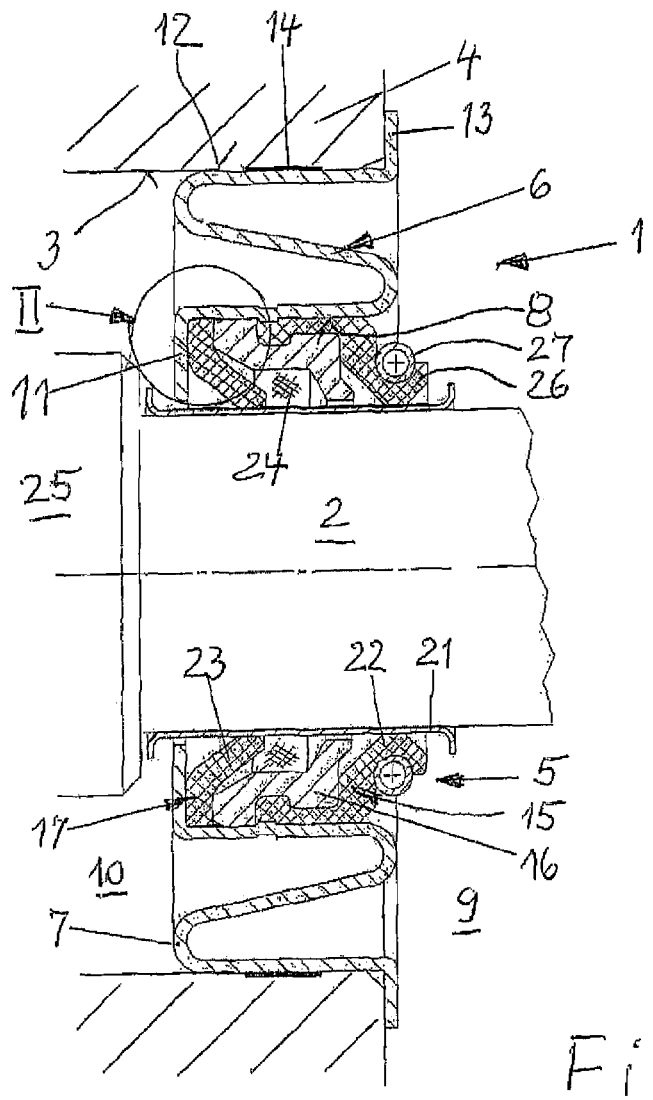

| | | | |
|---|---|---|---|
| 4,848,776 | A | 7/1989 | Winckler |
| 6,257,587 | B1 * | 7/2001 | Toth et al. ............... 277/309 |
| 6,428,013 | B1 * | 8/2002 | Johnston et al. ............ 277/400 |
| 7,938,405 | B2 | 5/2011 | Kreutzer |
| 2005/0200082 | A1 * | 9/2005 | Madigan ............... 277/549 |
| 2007/0210529 | A1 | 9/2007 | Kreutzer et al. |
| 2010/0237568 | A1 | 9/2010 | Kreutzer et al. |
| 2010/0244389 | A1 | 9/2010 | Sanada et al. |

FOREIGN PATENT DOCUMENTS

| | | |
|---|---|---|
| JP | 2010-185580 A | 8/2010 |
| KR | 1991-0010179 B1 | 12/1991 |

OTHER PUBLICATIONS espacenet, English abstract for JP2010185580A, printed on Nov. 30, 2015.

* cited by examiner

RADIAL SHAFT SEAL

This application is the National Stage of International Application No. PCT/EP2013/052997, filed on Feb. 14, 2013, which claims the benefit of Germany patent application 10 2012 202 862.5 (filed on Feb. 24, 2012), both of which are hereby incorporated by reference.

I. BACKGROUND OF THE INVENTION

The invention relates to a radial shaft seal for sealing a shaft passing through a housing wall opening, comprising at least one membrane-like, annular sealing element with a sealing lip that can be positioned against the shaft in sealing fashion, a metallic, annular supporting element on which the sealing element is mounted, an edge area provided on the supporting element, which runs around the outer circumference and is not covered by the sealing element, and a centring surface provided on the outer circumference of the edge area.

A radial shaft seal with the features mentioned in the opening paragraph is known from DE 198 41 123 B4. In this known radial shaft seal, which has already proven highly successful in practice to date, both the centring surface of the circumferential edge area of the supporting element and the outer circumferential area of the sealing element are positioned against the inner wall of the housing wall opening through which the shaft passes.

The material of the sealing element preferably consists of a highly wear-resistant, elastomeric material. This material is extremely resistant to a large number of substances. The pump housings used for coolant pumps in automotive engineering are often made of thermosetting plastics. In this context, elevated operating temperatures can lead to the evolution of ammonia gas, formaldehyde gas and the like, which react with elastomeric materials and can lead to hardening of the material.

II. SUMMARY OF THE INVENTION

The object of the invention is therefore to create a radial shaft seal that is absolutely reliable and retains its sealing action, even after extremely long operating times.

According to the invention, the object is solved in that the seal is surrounded by an adapter part made of undulating sheet metal that can be inserted tightly into the housing wall opening, in that the adapter part displays a central, cylindrical opening provided with a shoulder on its rear end, seen in the pressure direction, in that the centring surface of the supporting element has an interference relative to the cylindrical opening of the adapter part and can be inserted into it in an interference fit, in that a second, membrane-like sealing element is located between the supporting element and the shoulder provided in the opening of the adapter part, and in that the second sealing element can be firmly pressed in between the shoulder and the supporting element.

In the radial shaft seal according to the invention, there is no direct contact between the material of the sealing elements and the wall of the housing. Rather, the material of the sealing element is only in contact with the adapter part made of stainless steel sheet, which is designed as a resilient intermediate element between the actual seal and the housing wall. Consequently, the material of the sealing elements cannot be impaired by the material of the housing wall.

Quite apart from having this positive effect, the sealing mechanism is absolutely reliable, as the new design arrangement results in a sealing action in both the radial direction and the axial direction. Radial sealing is achieved in the conventional manner, by the supporting element in combination with the first sealing element, and the axial sealing action is achieved by the fact that the second sealing element is pressed against the shoulder provided on the adapter part with the help of the supporting element. The second sealing element preferably consists of polytetrafluoroethylene (PTFE), which demonstrates extremely high wear resistance and thus guarantees a long service life of the seal.

This new sealing mechanism can be permanently maintained by impressing individual mechanical notches through the sheet metal of the adapter part from the outside for securing the supporting element in the axial direction. This ensures that the supporting element is held in position, even in the event of severe loading of the seal and the possible occurrence of vibrations.

The notches can be made in such a way that, seen in the pressure direction, they are located immediately upstream of the press-fitted outer edge area of the supporting element, such that absolutely reliable, positive fixing of the supporting element within the adapter part is guaranteed.

The sealing lips of the two sealing elements, which are positioned against the shaft in sealing fashion, can be inclined in the direction opposite to the pressure direction. This means that optimum sealing is also ensured in the area between the seal and the shaft.

Preferably provided radially inside the supporting element is a space that can be filled with grease, if needed.

A particularly expedient embodiment of the radial shaft seal according to the invention consists in that a sleeve, which extends at least over the entire length of the seal, is provided radially inside the seal and can be slid onto the shaft to be sealed with an interference fit during subsequent assembly.

The sleeve can be flanged at both ends, so as to be captively connected to the seal. The sleeve is assembled in that one side is flanged first. The space inside the supporting element is then filled with grease, the sleeve subsequently being pushed through the seal. The second side of the sleeve is then flanged, the sleeve later being pushed onto the shaft in an interference fit.

The adapter part preferably has a cylindrical circumference that can be inserted tightly into the housing wall opening.

To obtain an optimum design of the seat of the adapter part, the adapter part can be provided with a radial flange on the pressure side of the seal, which can be positioned tightly against the wall area surrounding the housing wall opening.

To produce an absolutely reliable seal, the outer cylindrical circumference of the adapter part can be provided with an all-round sealing coating, at least over part of its axial length.

An additional sealing action between the seal and the shaft or the sleeve is achieved in that the sealing lip of the sealing element located on the pressure side has an outward-facing curvature on its end positioned against the shaft or the sleeve, and in that a split washer is located inside the outer groove formed by the curvature.

In an alternative embodiment of the radial shaft seal according to the invention, the pressure side of the sealing lip provided on the second sealing element can display a curvature on its end positioned against the shaft or the sleeve, where a split washer is located inside the receiving groove formed by the curvature, as on the first sealing element. The sealing action can be further improved by this design of the second sealing area.

Furthermore, on the sealing lip provided on the second sealing element, an all-round projecting nose that lies on the shaft or the sleeve in sealing fashion can be provided on the side facing away from the bearing or on the air side. This sealing nose ensures that no dirt can penetrate the pump area from the outside.

III. BRIEF DESCRIPTION OF THE DRAWINGS

An example of the invention is illustrated in the drawing and described in detail below on the basis of the drawing.

Figure 2:
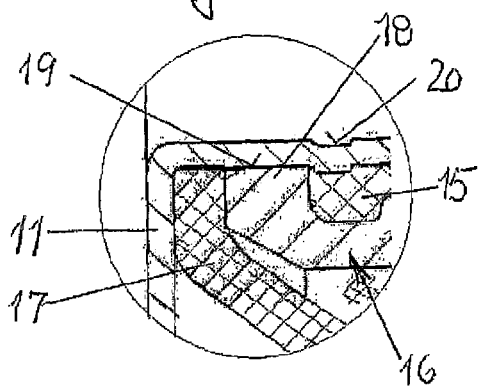

FIG. 1: A section through the radial shaft seal according to the invention, such as installed in a coolant pump envisaged for motor vehicles, FIG. 2: An enlarged view of Detail II, marked in FIG. 1, and FIG. 3: The same section as in FIG. 1, but of a second embodiment of the radial shaft seal according to the invention.

V. DETAILED DESCRIPTION OF THE INVENTION

Radial shaft seal 1, shown in the drawing, serves to seal off shaft 2, which passes through opening 3 in housing wall 4 of a coolant pump.

Radial shaft seal 1, shown in the drawing, consists of a sealing area 5 that immediately surrounds shaft 2, and an adapter part 6 that surrounds sealing area 5 and consists of undulating sheet metal 7.

Adapter part 6 is designed in the manner of bellows, is made of thin stainless steel sheet and displays a central, cylindrical opening 8.

In the practical example illustrated in the drawing, pressure side or water side 9 is to the right of the seal, while air side 10 is on the left-hand side. Cylindrical opening 8 of adapter part 6 is provided with a shoulder 11, facing towards shaft 2, on its rear end as seen in the pressure direction, i.e. on the left-hand side in the drawing. In this context, shoulder 11 is formed by an all-round, integral flange.

In its radially outer area, adapter part 6 displays a cylindrical circumference 12, which is inserted tightly in opening 3 of housing wall 4. On pressure side 9, adapter part 6 is provided with a radial flange 13, which is positioned tightly against the wall area surrounding housing wall opening 3.

Outer cylindrical circumference 12 of adapter part 6 is provided with an all-round sealing coating over part of its axial length to guarantee a tight fit of adapter part 6 in housing wall opening 3.

On pressure side 9, the actual sealing area 5, which extends towards shaft 2, consists of a membrane-like, annular sealing element 15 made of elastomeric material, an annular, metallic supporting element 16, on which sealing element 15 is preferably mounted under prestress, and a second sealing element 17 that is made of PTFE Material and located, in the direction of the air side of the seal, between supporting element 16 and shoulder 11 of adapter part 6.

Provided on supporting element 16 is an all-round outer edge area 18, which is not covered by first sealing element 15. The outer circumference of edge area 18 of supporting element 16 is provided with a centring surface 19, which displays an interference relative to cylindrical opening 8 of adapter part 6 and is inserted into the latter in an interference fit.

Second sealing element 17, located between metallic supporting element 16 and shoulder 11 of adapter part 6, is pressed tightly against shoulder 11 by means of supporting element 16. As a result, both axial and radial sealing is achieved in the area shown in enlarged form in FIG. 2, this being particularly reliable.

To axially secure supporting element 16 in its press-fitted position, notches 20 are impressed into the sheet metal of adapter part 6, from the outside, by means of a tool resembling pliers and specifically at several points, uniformly distributed around the circumference. Notches 20, which reach through the sheet metal in the form of inner projections, are made immediately upstream of edge area 18 of supporting element 16 in the pressure direction, such that an extremely tight fit of supporting element 16 in its position inside adapter part 6 is guaranteed.

Provided between sealing area 5 and shaft 2 is a sleeve 21, which extends over the entire length of seal 1 and a short distance beyond. Sleeve 21 is flanged at both ends, so as to sit captively on seal 1.

Both sealing elements 15 and 17 are provided with sealing lips 22, 23, which are inclined in the direction opposite to the pressure direction and positioned against sleeve 21 under prestress in fully assembled state.

Provided radially inside supporting element 16 is a space that can be provided with a grease filling 24.

Grease filling 24 is injected prior to inserting sleeve 21. Sleeve 21, which has already been flanged at one end, is then passed through the inner area of seal 1 and subsequently also flanged at the other end, such that it sits tightly in seal 1—although possibly in a manner permitting slight axial displacement.

Sleeve 21 is made of steel with a high surface hardness and is pushed onto shaft 2 in an interference fit when assembling the pump. Adjacent to sleeve 21 on the air side is a bearing 25, which bears shaft 2 and is not shown in detail in the drawing.

On its end positioned against sleeve 21, sealing lip 23 of sealing element 15, located on the pressure side, displays a curvature 26 with an outward-facing end part, this creating an all-round outer groove. A split washer 27 is inserted into this outer groove, as a result of which sealing lip 22 is additionally pressed specifically against sleeve 21.

While first sealing element 15, facing towards the pressure side, is made of elastomeric material, second sealing element 17 is made of more stable polytetrafluoroethylene (PTFE), which guarantees a long service life of the seal in the present application. The PTFE can be filled, specifically with glass fibres or carbon, for example.

For the present application, adapter part 6 is made of thin stainless-steel sheet. The bellows-like shape means that radial and axial vibrations of shaft 2 can conveniently be absorbed via the pump housing.

Figure 3:
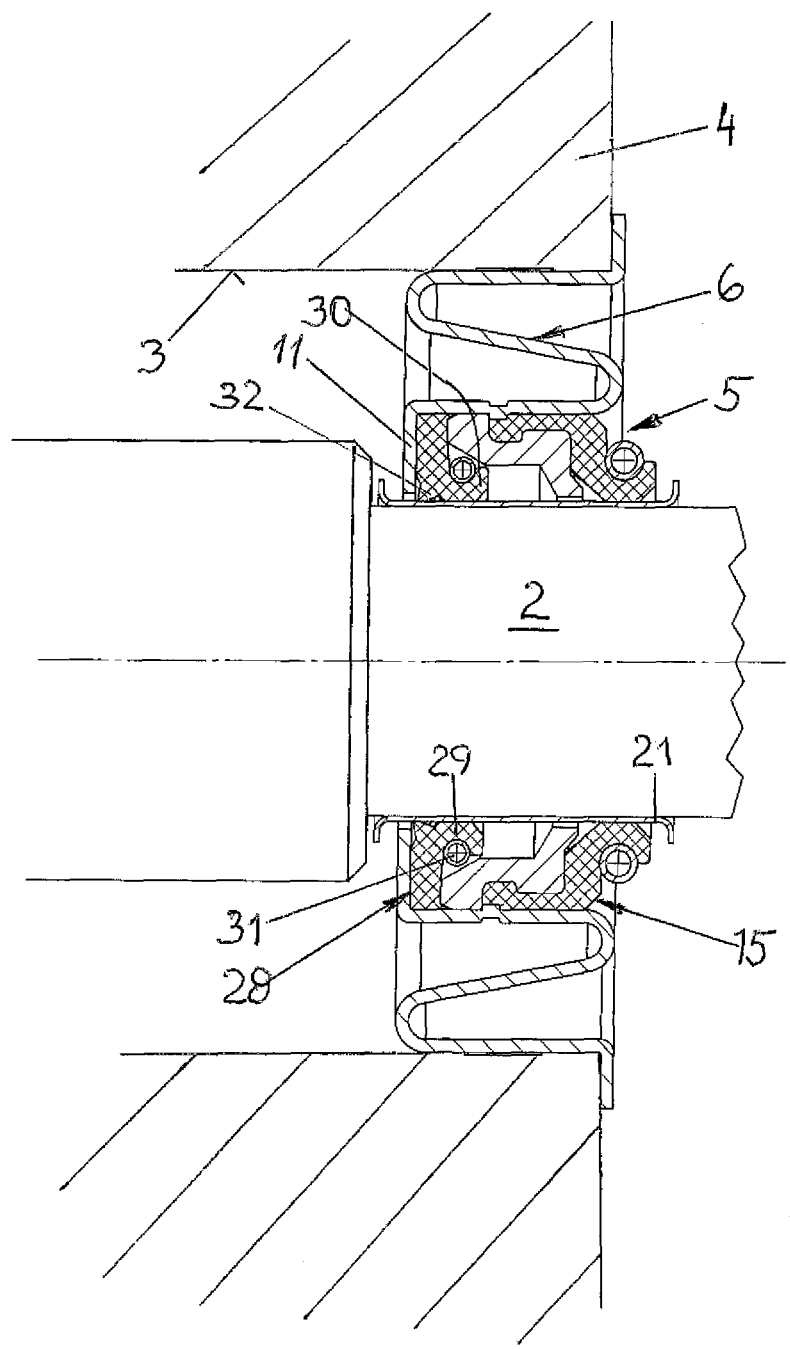

FIG. 3 shows the same section as FIG. 1, where identical parts have the same reference numbers as used in FIG. 1.

In this practical example, too, the radial shaft seal according to the invention serves to seal off a shaft 2, which passes through opening 3 of housing wall 4 of a coolant pump.

As in the practical example shown in FIG. 1, sealing area 5 sits in an adapter part 6 that consists of undulating sheet metal.

In the same way as in the practical example shown in FIG. 1, sealing area 5 is essentially formed by two sealing elements, where first sealing element 15 is identical to the sealing element according to FIG. 1. Second sealing element 28, provided in place of sealing element 17 shown in FIG. 1, is provided with a modified sealing lip 29. On its end positioned against shaft 2 or sleeve 21, sealing lip 29, facing towards the pressure side, displays a curvature 30, where a split washer 31 is located inside the receiving groove formed by curvature 30. The task of the split washer is to press down the sealing lip, in order to even further improve the sealing action.

Provided on the air side of sealing lip 29, provided on second sealing element 28, is an all-round projecting nose 32, which is positioned against shaft 2 or sleeve 21. This all-round nose 32 is primarily intended to provide additional sealing off from the outside, such that no dirt particles can get into the inside of the pump from outside.

The radial shaft seal according to the invention assures a long service life, this playing an important role in the automotive sector, in particular, when the seal in installed in cooling-water pumps, for example.

VI. LIST OF REFERENCE NUMBERS

1 Radial shaft seal
2 Shaft
3 Housing wall opening
4 Housing wall
5 Sealing area
6 Adapter part
7 Metal sheet
8 Opening
9 Pressure or water side
10 Air side
11 Shoulder
12 Cylindrical circumference
13 Flange
14 Sealing coating
15 First sealing element
16 Supporting element
17 Second sealing element
18 Edge area of supporting element 16
19 Centering surface
20 Notch
21 Sleeve
22 Sealing lip
23 Sealing lip
24 Grease filling
25 Bearing
26 Curvature of sealing lip 23
27 Split washer
28 Second sealing element
29 Sealing lip
30 Curvature of sealing lip 29
31 Spit washer
32 Projecting nose

The invention claimed is:

1. Radial shaft seal for sealing a shaft passing through a housing wall opening, comprising:
   at least one membrane-like, annular first sealing element with a sealing lip that can be positioned against the shaft in sealing fashion,
   a metallic, annular supporting element on which the sealing element is mounted,
   an edge area provided on the supporting element, which runs around the outer circumference and is not covered by the sealing element, and
   a centering surface provided on the outer circumference of the edge area,
   an adapter part surrounding the seal, the adapter part made of undulating sheet metal that can be inserted tightly into the housing wall opening, in that the adapter part displays a central, cylindrical opening provided with a shoulder on its rear end, seen in the pressure direction, in that the centering surface of the supporting element has an interference relative to the cylindrical opening of the adapter part and can be inserted into it in an interference fit, in that a second, membrane-like sealing element is located between the supporting element and the shoulder provided in the opening of the adapter part, and in that the second sealing element can be firmly pressed in between the shoulder and the supporting element.

2. Radial shaft seal according to claim 1, wherein individual mechanical notches are impressed through the sheet metal of the adapter part from the outside for securing the supporting element in the axial direction.

3. Radial shaft seal according to claim 2, wherein as seen in the pressure direction, the notches are located immediately upstream of the press-fitted outer edge area of the supporting element.

4. Radial shaft seal according to claim 3, wherein the sealing lips of the two sealing elements, which are positioned against the shaft in sealing fashion, are inclined in the direction opposite to the pressure direction.

5. Radial shaft seal according to claim 4, wherein a space is provided radially inside the supporting element.

6. Radial shaft seal according to claim 5, wherein the space inside the supporting element is provided with a grease filling.

7. Radial shaft seal according to claim 1, wherein a sleeve, which extends at least over the entire length of the seal, is provided radially inside the seal and can be slid onto the shaft to be sealed with an interference fit.

8. Radial shaft seal according to claim 7, wherein the sleeve is flanged at both its ends.

9. Radial shaft seal according to claim 8, wherein the adapter part has an outer cylindrical circumference that can be inserted tightly into the housing wall opening.

10. Radial shaft seal according to claim 9, wherein the adapter part is provided with a radial flange on the pressure side of the seal, which can be positioned tightly against the wall area surrounding the housing wall opening.

11. Radial shaft seal according to claim 9, wherein the outer cylindrical circumference of the adapter part is provided with an all-round sealing coating, at least over part of its axial length.

12. Radial shaft seal according to claim 7, wherein the sealing lip of the sealing element located on the pressure side has an outward-facing curvature on its end positioned against the shaft or the sleeve, and in that a split washer is located inside the outer groove formed by the curvature.

13. Radial shaft seal according to claim 7, wherein on the sealing lip provided on the second sealing element, an all-round projecting nose that lies on the shaft or the sleeve is provided on the air side.

14. Radial shaft seal according to claim 1, wherein the pressure side of the sealing lip provided on the second sealing element displays a curvature on its end positioned against the shaft or the sleeve, and in that a split washer is located inside the receiving groove formed by the curvature.

15. Radial shaft seal according to claim 1, wherein the sealing lips of the two sealing elements, which are positioned against the shaft in sealing fashion, are inclined in the direction opposite to the pressure direction.

16. Radial shaft seal according to claim 1, wherein a space is provided radially inside the supporting element.

17. Radial shaft seal according to claim 16, wherein the space inside the supporting element is provided with a grease filling.

18. Radial shaft seal according to claim 1, wherein the adapter part has an outer cylindrical circumference that can be inserted tightly into the housing wall opening.

19. Radial shaft seal according to claim 18, wherein the outer cylindrical circumference of the adapter part is provided with an all-round sealing coating, at least over part of its axial length.

20. Radial shaft seal according to claim 1, wherein the adapter part is provided with a radial flange on the pressure side of the seal, which can be positioned tightly against the wall area surrounding the housing wall opening.

* * * * *